United States Patent Office 3,536,674
Patented Oct. 27, 1970

---

3,536,674
ARYLENE SULFIMIDE POLYMERS
Gaetano F. D'Alelio, South Bend, Ind., and William E. Gibbs and Richard L. Van Deusen, Xenia, Ohio, assignors to the United States of America as represented by the Secretary of the Air Force
No Drawing. Filed Sept. 15, 1967, Ser. No. 668,251
Int. Cl. C08q 20/20, 20/32, 20/36
U.S. Cl. 260—78    16 Claims

ABSTRACT OF THE DISCLOSURE

New polymers of improved resistance to high temperatures comprising polyarylene sulfimide polymers, including thiazone polymers, prepared by (a) the intra-condensation of an aromatic compound having the formula

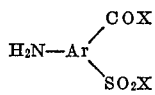

or (b) by the condensation of tetrafunctional aromatic polysulfonic compounds of the formula:

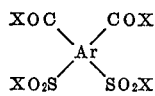

with polyamines of the formula $H_2N-Ar'-NH_2$ wherein Ar and Ar' represent polyvalent nuceli, and where the Ar' nucleus has two more $NH_2$ groups attached the polyamine has the formula $(H_2N)_2Ar'(NH_2)_2$; the $SO_2X$ groups are each paired with a COX radical in an ortho or peri position; X is OR, Cl, Br, ONa, or two X's of adjacent functional groups can together represent —O— or —NR—; and R is hydrogen or a hydrocarbon radical of no more than 20 carbon atoms. The polymers of this invention can be used for preparing laminates, adhesives, fibers, and molding compositions, particularly for use at high temperatures such as in aerospace flight.

---

While the true "thiazone" polymers are only those derived from the reaction of the tetrafiunctional polysulfonic compounds with aromatic tetraamines, the term "thiazones" is applied generically herein for the purpose of simplicity to cover the cyclic arylene sulfimide repeating units which include the structure

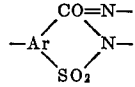

as illustrated below by formulas A, B and C.

By prolonged heating or postheating the polymers produced by the original above condensations are converted to a repeating unit structured comprising at least one percent by weight of the "thiazone" structure represented by one of the formulas:

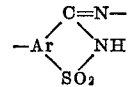

(Formula A)

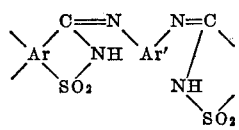

(Formula B)

or

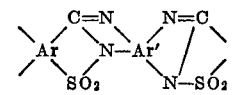

(Formula C)

The intermediate A–B or AABB types of polymers described below can be converted to thiazone polymers of the present invention having at least one percent by weight of one of the above thiazone repeating units by heating the intermediate polymer at 300° C. for at least 15 minutes.

The invention described herein may be manufactured and used by or for the United States Government for governmental purposes without payment to us of any royalty thereon.

CROSS-REFERENCES TO RELATED APPLICATIONS

The following copending patent applications have been filed on the same date herewith: U.S. Ser. No. 668,255 entitled "Arylene Sulfimide Polymers" and sometimes referred to hereinafter as "A–B Polymer Application"; U.S. Ser. No. 668,753 entitled "Tetrafunctional Aromatic Sulfonic Compounds" and sometimes referred to hereinafter as "Tetrafunctional Monomer Applications"; and U.S. Ser. No. 668,254 entitled "Arylene Sulfimide Polymers" and sometimes referred to hereinafter as "Tetrafunctional Polymer Application" or "AABB Polymer Application."

BACKGROUND OF THE INVENTION

There has always been a great interest in developing organic polymers of high heat resistance. Obviously, the decomposition, discoloration, charring, loss of weight, and even combustion resulting upon exposure of organic materials, including organic polymers to high temperatures has been a drawback in the use of such materials. Therefore, in spite of the various advantages of using organic polymers, such as availability, ease in fabrication, weight and in many cases economics, there is a limitation on the use of organic polymers where high temperatures are likely to be encountered.

SUMMARY OF THE INVENTION

In accordance with the present invention, a new series of polymers has been found which are capable of withstanding extremely high temperatures, namely up to 500–600° C. and in some cases even as high as 1000° C. These new polymers are condensation polymers of two types, one sometimes referred to hereinafter as A–B polymers and the other sometimes referred to hereinafter as the AABB polymers. The polymers of the present invention are derived from intermediate polymers, such as disclosed and claimed in the aforementioned "A–B polymer" and "Tetrafunctional Polymer" (or AABB polymer) applications. In each case the intermediate polymer is given prolonged heating or postheating to effect further condensation resulting in at least one percent by weight of one of the structures represented above by Formulas A, B and C, each of which is characterized by the structure

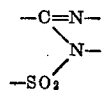

which is easily identified by infrared analysis. The remainder of the polymers comprise repeating units as described for the intermediate polymers.

The A–B type of intermediate polymer is prepared by the condensation of monomers having the formula:

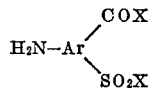

wherein Ar and X are as defined below.

As described in the copending "A-B Polymer Application" the A-B polymers are prepared by the condensation of monomeric aromatic compounds having a condensible amino group and a combination of carboxylic and sulfonic radicals ortho or peri to each other. These latter two radicals can be condensed imide or other derivative form as described herein.

The A-B polymers have repeating units of one or both of the open repeating unit structure:

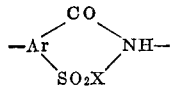

or of the closed or cyclic repeating unit structure:

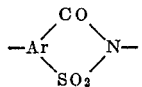

When the open structure of the formula:

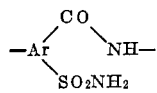

is heated at 300° C. or higher for at least 15 minutes the thiazone repeating unit structure is formed:

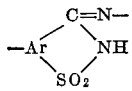

Thiazone polymers of this invention derived from A-B polymers can therefore be defined as having at least one percent by weight of the above thiazone repeating unit structure and the balance comprising either or both the above open and cyclic repeating unit structures.

The AABB type of intermediate polymer is prepared from monomeric aromatic compounds having two or more amino radicals condensed with the monomeric tetrafunctional compounds disclosed in the aforementioned copending tetrafunctions "Monomer Application," which new monomeric compounds contain four functional groups comprising two pairs in which the two members of each pair are ortho or peri to each other and at least one member of each pair is a sulfonic radical and the other functional group of the pair is either a carboxylic or a sulfonic group.

These tetrafunctional monomers can be represented by the formula:

 (Formula I)

wherein Ar represents a polyvalent aromatic nucleus, such as benzene, naphthalene, diphenyl, diphenyl oxide, diphenylsulfide, diphenylsulfone, diphenylsulfoxide, diphenylketone, diphenlamine, diphenylmethane, etc.; each of the $SO_2X$ groups is paired with a Y in ortho or peri position to it; Y represents $—COX$ or another $SO_2X$; X is OR, Cl, Br, or ONa, or 2Xs of adjacent functional groups can represent $—O—$ or $—NR—$; and R is hydrogen or a hydrocarbon radical of no more than 20, preferably no more than 10 carbon atoms. Preferably the Ar represents benzene, naphthalene, or diphenyl. Moreover, where "ortho" positioning is referred to herein, the "peri" positions, or 1,8 and 4,5 paired positions of naphthalene are considered equivalent to ortho positioning for the purpose of this invention.

The AABB polymers consist essentially of repeating units having one or more of the following structures sometimes generically referred to herein as Z:

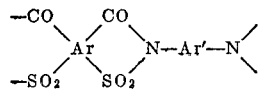 (Formula II)

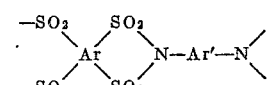 (Formula III)

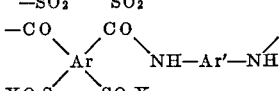 (Formula IV)

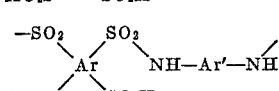 (Formula V)

Ar' is also a polyvalent nucleus similar to Ar.

Condensation reactions by which the intermediate AABB polymers are produced can be represented as follows:

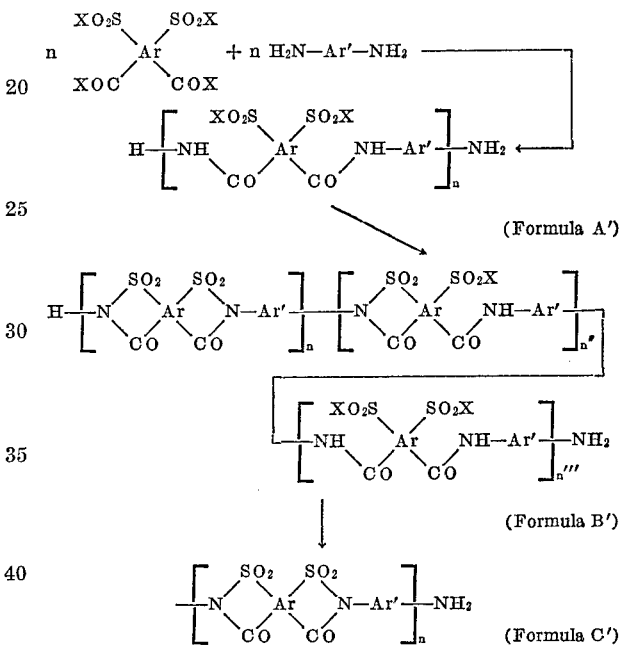

(Formula A')

(Formula B')

(Formula C')

Formula A' represents the hemipolymers of the initial stages. Formula B' represents the polymers in intermediate stages as ring closure is effected. The relative values or ratio of n' to n''' can vary over a wide range. The middle repeating unit structure of Formula B' is generally omitted to simplify the overall structure which is generally represented as having two closed or open rings in the particular repeating unit. The structure of Formula C can be achieved but heating is generally stopped before complete cyclization is effected.

The polymers of this application are distinguished from those of the copending "A-B Polymer Application" and "Tetrafunctional Polymer Application" by the presence in polymers of this invention of thiazone radicals having the structure

The presence of such radicals in the polymers is easily determined by characteristic infrared analysis. This determination clearly indicates the presence and amount of such radicals. The present application covers polymers which can have and generally have a high proportion of the repeating units described in the aforementioned copending applications but also have the thiazone radical in the polymer structure.

The terminal groups on the tetrafunctional polymers will depend on whether the condensation reagents are used in stoichiometric amounts or whether one is used in excess. When excess polyamine is used the terminal groups will be H, R or $>N—Ar'—NHR$. When excess polyfunctional monomer is used the terminal groups will be X at the left terminus of one of the repeating units as, drawn and, at the right side of the repeating unit at the other end of the polymer, as drawn:

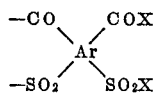

or

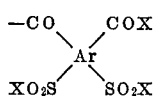

Generally the polymers are represented as prepared by use of stoichiometric amounts of monomeric reagents. Therefore, the various polymers can be represented by the following formulas wtih the understanding that the terminal groups can vary according to whether one reagent is used in excess. The various symbols have the meanings defined above and $n$ has a value of at least 2, and preferably at least 4.

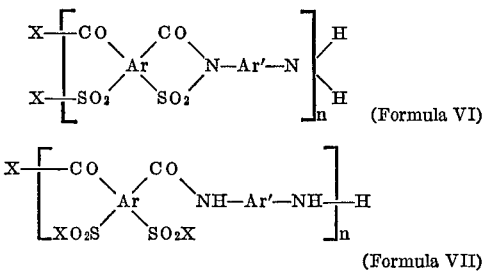

(Formula VI)

(Formula VII)

When the polyamine has two additional ortho or peri amine groups, that is an aromatic tetraamine having two pairs of ortho or peri positioned amino groups, the true thiazone structure can be derived as represented by the following formulas which represents the initial or intermediate hemipolymer and the ultimate true thiazone polymer respectively:

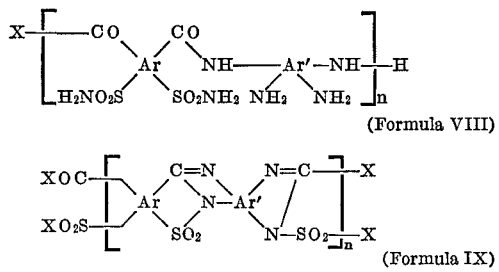

(Formula VIII)

(Formula IX)

In most cases there are a mixture of the two types of repeating units in the polymer with the number ($n'$) of the hemi type of repeating unit being much greater at the earlier stages of the heating and the number ($n''$) of the thiazone repeating units increasing as the heating progresses. If the heating is continued long enough the value of $n''$ approaches the value of $n$ and $n'$ becomes very small.

DESCRIPTION OF PREFERRED EMBODIMENTS

Various typical monomeric materials that can be used in preparing the polymers of this invention are illustrated by but not limited to the following: 5-aminosaccharin, 6-aminosaccharin, (the 4- and 7-aminosaccharins are more difficult to prepare but nevertheless can be used), the derivatives of the various aminosaccharins in which the hydrogen on the nitrogen of the heterocyclic ring has been replaced by methyl, butyl, phenyl, cyclohexyl, allyl, etc., 2-sulfo-4-aminobenzoic acid and its anhydride, acidamides, diamide, acid halides, such as the diacid chloride, and various esters such as the diethyl, dimethyl, diamyl, diphenyl, dially, dicyclohexyl, etc., 2-sulfo-5-amino-benzoic acid and its corresponding derivatives as listed above for the sulfo-amino-benzoic acids, 3-sulfo-5-amino-beta-naphthoic acid and its corresponding derivatives; including the cyclicamide; 5-amino-1,2-naphthalene-disulfonic acid, and its anhydride, acid halides, acidamides, diamide, and various esters such as dimethyl, diphenyl, dicyclohexyl, etc., 6-amino-2,3-naphthalene disulfonic acid and its various corresponding derivatives; 4-carboxy-3-sulfonic-4'-amino-diphenyl and its cyclicamide anhydried, acids, diamide, acid halides and various esters; and less desirable but suitable for many purposes are the 4-carboxy-3-sulfonic-4'-amino-diphenyl oxides, and the cyclic amide anhydride, acid amides, diamide, acid halides, and esters thereof; 4-carboxy-3-sulfonic-4'-amino-diphenyl amine, 4-carboxy-4-sulfonic-4'-amino-diphenyl sulfide, 3,4-disulfonic-4'-amino-diphenyl oxides, and the cyclic amide anhydride, acid amides, diamide, acid halides, and esters thereof, 3,4-disulfonic-4'-amino-diphenyl amine, 3,4-disulfonic-4'amino-diphenylsulfides.

In addition to the various methods of preparing the monomeric materials listed above and illustrated hereinafter in Examples I(A)–(J), various other methods can be used which give the desired structures. Generally the starting material is selected to give the amine group in a desired position with respect to the two ortho-functional groups. In some cases, however, such as in double ring systems, such as naphthalene and diphenyl, the exact position of the amino group with respect to the ring-forming groups is of less importance than with regard to benzene compounds.

In addition to melt polymerization, the polymerizations of this invention can be conducted in an activating medium, such as a triethylamine-water system, dimethylformamide, dimethylsulfoxide, butyrolactone, polyphosphoric acid and dimethylacetamide. The temperature and the time of heating can be varied according to the type of polymer and the degree of polymerization desired. The hemi-polymers are generally soluble in dimethylacetamide, but the solubility decreases as the heating is continued and more of the repeating units are thereby converted to the cyclic structure. Final ring closures in the polymers occur in the range of 400–500° C.

Generally the polymers are not completely of the closed ring type and there is usually at least a small amount of the open type structure. Generally, as the polymerization progresses the ratio of closed to open structures keeps increasing until there are very few repeating units of the open structure.

Moreover, in formulas where two types of repeating units are indicated and subscripts $n'$ and $n''$ are used to indicate the number of such units, it is not intended that these formulas represent block copolymers. Instead, the two types of repeating units are distributed at random along the polymer chain and the similar repeating units are grouped within the brackets merely to indicate the number of such repeating units.

Typical tetrafunctional monomeric compounds prepared according to methods described in the tetrafunctional Monomer Application and useful in preparing the polymers of this invention are illustrated by the following compounds:

(1) Benzene-1,3-dicarboxyl-4,8-disulfonic acid, sometimes hereinafter referred to as "m-Tetraacid";

(2) The dianhydride of m-Tetraacid, which is sometimes referred to herein as "m-Bianhydride";

(3) The dicyclicimide of m-Tetraacid, which is sometimes referred to herein as "m-Bisaccharin";

(4) The diesters of m-Bisaccharin, such as the diethyl ester of m-Bisaccharin, which is also known as diethyl-4,6-disulfamideisophthalate;

(5) Naphthalene-1,5-dicarboxyl-2,6-disulfonic acid and the corresponding dianhydride, dicyclicimide and diesters;

(6) Naphthalene-1,5-dicarboxyl-4,8-disulfonic acid and the corresponding dianhydride, dicyclicimide and diesters;

(7) Naphthalene-2,6-dicarboxyl-3,7-disulfonic acid and its corresponding derivatives;

(8) Diphenyl-4,4'-dicarboxyl-3,3'-disulfonic acid and its corresponding dianhydride, dicyclicimide and diesters;

(9) Diphenyl-3,3'-dicarboxyl-4,4'-disulfonic acid and its corresponding derivatives;

(10) Diphenylmethane - 4,4' - dicarboxyl-3,3'-disulfonic acid and its corresponding dianhydride, dicyclicimide and diesters;

(11) Diphenyloxide - 4,4' - dicarboxyl-3,3'-disulfonic acid and its corresponding dianhydride, dicyclicimide and diesters;

(12) Diphenylsulfide - 3,3' - dicarboxyl-4,4'-disulfonic acid and its corresponding derivatives;

(13) Diphenylsulfone - 4,4' - dicarboxyl-3,3'-disulfonic acid and its corresponding dianhydride, dicyclicimide and diesters;

(14) Diphenylsulfoxide - 4,4' - dicarboxyl-3,3'-disulfonic acid and its corresponding derivatives;

(15) Diphenylamine - 3,3' - dicarboxyl-4,4'-disulfonic acid and its corresponding derivatives;

(16) Diphenylketone - 4,4' - dicarboxyl-3,3'-disulfonic acid and its corresponding derivatives;

(17) Diphenylmethane - 3,3' - dicarboxyl-4,4'-disulfonic acid and its corresponding derivatives.

These and other compounds used in the practice of this invention can be prepared by various methods but preferred methods are illustrated in the working examples of the above-mentioned copending Tetrafunctional Monomer Application.

In the preparation of the tetrafunctional monomers, precautions must be taken to ensure that the Y groups are adjacent an —SO₂X group. This can be accomplished by various means. For example, p-xylene can be disulfonated to give 2,5-xylene disulfonic acid. This compound can be oxidized to convert the methyl groups to carboxylic acid groups. Where it is desired to position two sulfonic groups ortho to each other, this can be effected by selecting appropriate starting materials so that the first two sulfonic acid groups will each be positioned ortho to a group which subsequently can be converted by any suitable means to a sulfonic acid group. Such positioning is illustrated hereinafter.

Typical preparations of tetrafunctional monomers having carboxylic and sulfonic acid groups are illustrated by the following:

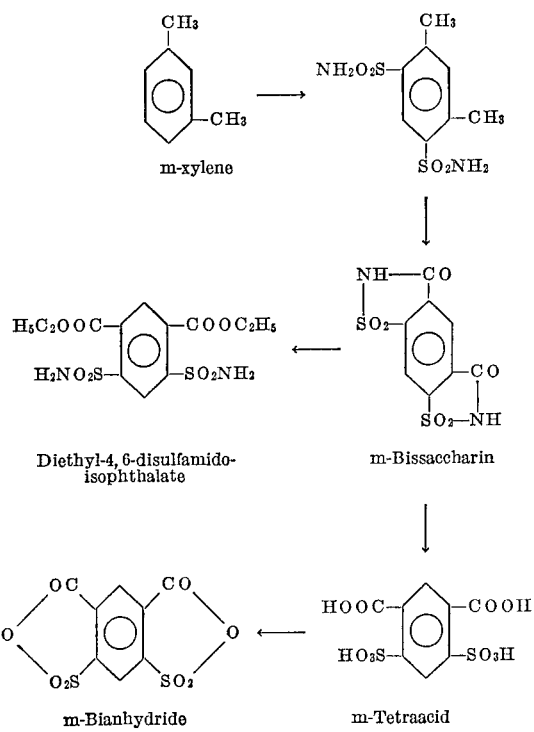

Formulas of some of these preferred tetrafunctional monomeric compounds are represented by the following structural formulas:

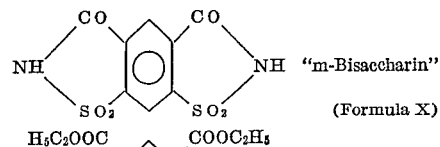
"m-Bisaccharin" (Formula X)

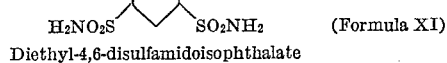

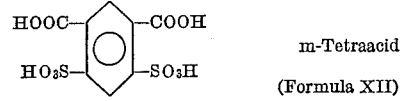
(Formula XI)
Diethyl-4,6-disulfamidoisophthalate

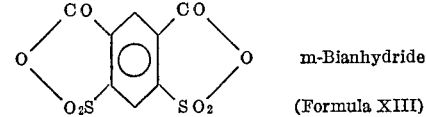
m-Tetraacid (Formula XII)

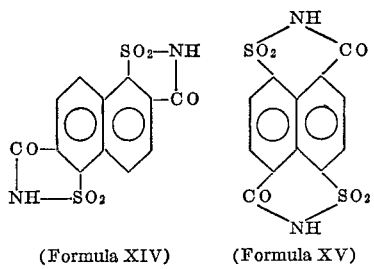
m-Bianhydride (Formula XIII)

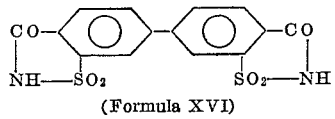
(Formula XIV) (Formula XV)

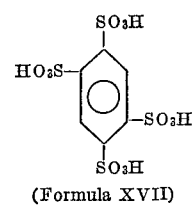
(Formula XVI)

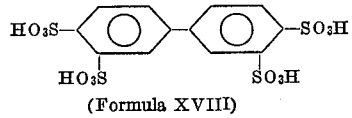
(Formula XVII)

(Formula XVIII)

In the polymerizations of this invention the tetrafunctional monomers described above are condensed with polyfunctional aromatic amines of the formula $$NH_2—Ar'—NH_2$$

The Ar' is a polyvalent aromatic, sometimes a divalent radical, as described above for Ar, and other groups can be on the aromatic nucleus as described for Ar. There can also be one of two additional NH₂ groups so as to include aromatic triamines and tetraamines. Preferably the Ar' is a benzene, naphthalene or diphenyl radical having only NH₂ groups attached.

Where reference is made to bisaccharin condensations with such polyamines it is intended to include similar condensations using corresponding tetraacids, dianhydrides, esters, amides, etc.

The polymerization reactions of the bisaccharins proceeds best by "transamidation," e.g. when performed in the presence of an amine, such as in a triethylamine-water system. The bisaccharin reaction mixtures when heated at 200–220° C. for several hours give hemipolymers which are soluble in dimethylacetamide. The respective infrared spectra shows that the hemipolymers exist mainly in the form of:

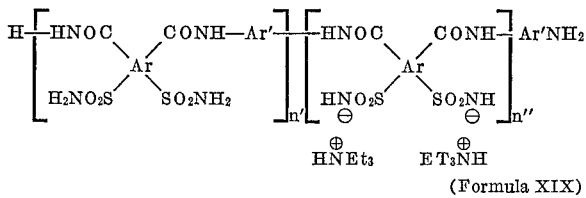

(Formula XIX)

wherein $n'$ is greater than $n''$.

If the triethylamine is removed the hemipolymer has the formula:

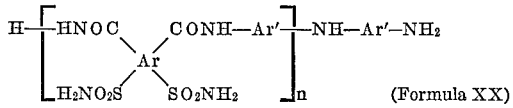

(Formula XX)

As ring closure of the saccharin type is effected the polymer acquires the structure:

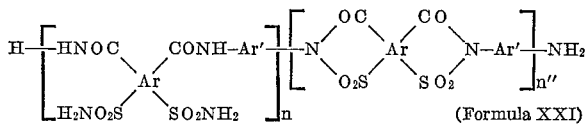

(Formula XXI)

As the value of the $n''$ to $n'$ ratio increases the polymer becomes more insoluble.

When a tetraamine compound is used, the initial hemipolymer has the formula:

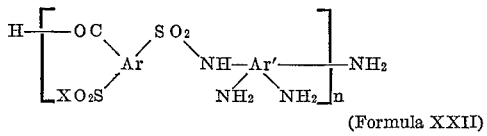

(Formula XXII)

As ring closure is effected the number of repeating units represented above becomes very small and the polymer has primarily the structure:

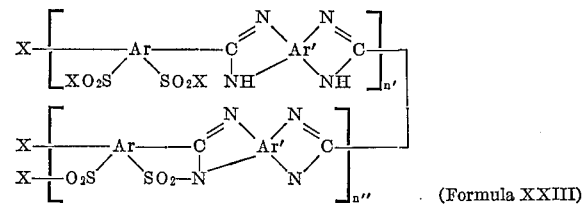

(Formula XXIII)

As the heating is continued $n''$ becomes larger and $n'$ smaller until the structure given above in Formula IX is approached.

In preparing the polysaccharine type of polymer, the sulfonic and the carboxylic groups of the starting monomer can be in the acid form or in a derivative form such as ester, amide, anhydride, imide, acid halide or other form which is easily condensible with the amino groups attached directly to the Ar' aromatic nucleus and the ester, amide, etc. groups are displaced during the condensation reaction.

The polydisulfonimide types of polymers are prepared by using similar monomeric materials having a sulfonic acid group replacing the carboxylic group in the saccharine type of monomer. In this case also, the various derivative groups indicated above can be present in the starting compound provided they do not interfere with the condensation in either the preliminary hemipolymer formation or in completing the cyclic structure of the polymer.

Upon initial condensation, only one of the functional groups condenses with the amino group so as to form hemipolymers which have the repeating unit structure such as shown above in Formulas XIX, XX and XXIX. Upon further heating, the condensation with the second functional group is effected so as to produce the cyclic structure in the repeating units shown in Formulas XXI and XXIII.

When a saccharine type monomer is used, the initial condensation of the amino group is with the carboxy group and the ultimate cyclization in the repeating structure is completed through the sulfonic group.

The Ar and Ar' radicals are preferably a benzene nucleus but they can have a naphthalene, diphenyl, diphenyl oxide, diphenylamine, diphenylsulfide, diphenylketone, diphenylsulfone, diphenylsulfoxide, diphenylmethane, etc. nuclear structure and can have various substituent groups therein such as various hydrocarbon radicals, such as suitable for R, namely alkyl, alkenyl, aryl, alkaryl, aralkyl, cycloalkyl, cycloalkenyl, including as typical examples methyl, ethyl, propyl, butyl, hexyl, decyl, phenyl, tolyl, naphthyl, methylnaphthyl, ethylnaphthyl, diphenyl, xylyl, cyclohexyl, cyclopentyl, cyclohexenyl, methylcyclohexyl, methylcyclohexenyl, vinyl, allyl, hexenyl, octenyl, ethylphenyl, vinylphenyl, allylphenyl, etc.; and also chlorophenyl, bromophenyl, fluorophenyl, iodophenyl, trifluoromethyl, etc.; and also halogen atoms, such as chloro, bromo, iodo, fluoro, cyano, etc. Advantageously there are no more than 20 carbon atoms in such groups, preferably no more than about ten, particularly in the R group.

Numerous other types of radicals can be present, as previously indicated, provided they do not interfere with the condensation reaction or produce undesirable properties in the resultant polymer. Obviously, the undesirable properties will be determined in accordance with the ultimate use of the polymer. For example, if a derivative group is not capable per se of withstanding high temperatures, the presence of such a group in a polymer ultimately to be used for heat resistance purposes will not be satisfactory. However, for certain other uses where this particular group imparts a desirable property and the ultimate polymer is not to be used where heat resistance is required, then even such groups can be present. It is intended that the scope of the invention include polymers having such a variety of derivative groups. However, for most purposes, the simpler types of structures specifically disclosed herein are preferred. Moreover, while many groups included within the definition, such as acetylenic, spiro, cyclopentadienyl, butadienyl, etc., may be impractical, they are operable and are included in the broad scope of the invention.

In addition to melt polymerization, the polymerizations of this invention can be conducted in an activating medium, such as a triethylamine-water system, dimethylformamide, methylsulfoxide, butyrolactone, polyphosphoric acid and dimethylacetamide. The temperature and the time of heating can be varied according to the type of polymer and the degree of polymerization desired. The hemipolymers are generally soluble in dimethylacetamide, but the solubility decreases as the heating is continued and more of the repeating units are thereby converted to the cyclic structure. Final ring closures in the polymers occur in the range of 400–500° C.

Generally the polymers are not completely of the closed ring type and there is usually at least a small amount of the open type structure as shown above. Generally, as the polymerization progresses, the ratio of $n''$ to $n'$ keeps increasing until there are very few repeating units of the open structure so that $n'$ becomes relatively small. The sum of $n'$ plus $n''$ equals $n$.

Moreover, in formulas where two types of repeating units are indicated and subscripts $n'$ and $n''$ are used to indicate the number of such units, it is not intended that these formulas represent block copolymers. Instead, the two types of repeating units are distributed at random along the polymer chain and the similar repeating units are grouped within the brackets merely to indicate the number of such repeating units.

The polymerizations of the saccharine type of monomers are best conducted in the presence of a tertiary amine, such as triethylamine, tripropylamine, triphenylamine, tricyclohexylamine, etc. Such tertiary amines apparently catalyze the transamidation or replacement of the nitrogen originally attached to the carboxy group of the saccharine heterocyclic ring with the nitrogen of the amino group attached to the aromatic nucleus. The heterocyclic ring is thereby opened with the original nitrogen remaining attached to the sulfur until the ring is subsequently reclosed and the nitrogen attached to the sulfur being thereby completely eliminated.

The polymerizations can be conducted in any suitable equipment adapted to produce the conditions required. In most cases in the examples described hereinafter, the polymerization vessel is merely a glass tube or glass flask in which the required atmospheric conditions and the desired temperatures are maintained.

For determination of the thermal properties of the polymers, a 950 Thermogravimetric Analyzer marketed by Du Pont is used in conjunction with a 900 Differential Analyzer. A heating rate of 15° per minute is used and a number of Thermogravimetric measurements are made in nitrogen and in air at a flow rate of 0.5 standard liter per minute.

As previously indicated, the time of condensations can be varied in accordance with the type of product desired. The longer the heating period, the higher the degree of polymerization and the resultant molecular weight and ring closure. The effect of these factors is illustrated in the examples below.

As previously indicated the polymer products of this invention are useful for many purposes particularly where heat resistance is desired. They may be used in preparing laminates, adhesives, fibers, molding compositions, etc. Upon curing, these compositions become completely insoluble in common and extraordinary solvents. The hemipolymers or low molecular weight polymers can be dissolved or softened by solvents for various spinning, or shaping operations and cured after fabrication. When cured at 250° C. or higher any substrate material used with the polymer must be likewise capable of withstanding high temperatures. Fibers made from these materials can be made into heat-resistant fabrics suitable for aerospace purposes, such as parachutes, speed-breaking parachutes, etc. where heat is likely to be generated.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

Examples I and II describe runs in which monomers are prepared that are useful in preparing the polymers of this invention.

EXAMPLE I (A) Synthesis of 2-methyl-5-nitrobenzenesulfamide

In a typical experiment, 2-methyl-5-nitroaniline (1.52 g., 1.0 mole) and hydrochloric acid (340 ml., 12 N) are placed in a two-liter flask equipped with stirrer, etc., and cooled to about 0° C. A solution of sodium nitrite (75 g., 1.09 moles) in water (380 ml.) is added, with vigorous stirring, at a rate such that the temperature of the reacting mixture remains below 5° C. After the addition is completed, the mixture is stirred for thirty minutes, filtered, and the residue discarded. The filtrate is added to a vigorously stirred solution previously made by adding aqueous copper (II) chloride (40 g. of cuprous chloride in 36 ml. of water) to acetic acid (800 ml.) saturated with sulfur dioxide. A vigorous reaction occurs with the evolution of nitrogen and the formation of an oil layer. After stirring for forty-five minutes, the oil is isolated by means of a separatory funnel and collected.

The oil is added to a 500 ml. beaker containing ammonoium hydroxide (140 ml., 15 N) and water (140 ml.). This mixture is heated in a steam bath for thirty minutes and acidified with sulfuric acid (6 N). A white solid precipitates and is removed by filtration. The product is recrystallized from water and dried in vacuo. There is obtained 195 g. (90%) of a white crystalline solid, melting point 185–187° C. (The literature reports 2-methyl-5-nitro-benzenesulfonamide as melting at 186–187° C.)

(B) Oxidation of 2-methyl-5-nitrobenzenesulfonamide to 6-nitrosaccharin

Water (21.0 g.), sulfuric acid (57.6 g., Sp. Gr.—1.84) and sodium dichromate (30.0 g., 0.1 mole, 0.6 eq.) are placed in a one-liter three-neck round-bottom flask equipped with a reflux condenser, a mechanical stirrer and a dropping funnel. Pure 2-methyl-5-nitrobenzenesulfonamide (17.0 g., 0.686 mole, 0.48 eq.) is added and the flask is placed into a water bath at 54° C. Stirring is started and sulfuric acid (51.0 g., Sp. Gr.—184) is added slowly from the dropping funnel. After the addition of sulfuric acid is completed, the green mixture is stirred for forty-five minutes before pouring in onto crushed ice (500 g.). A white solid precipitates and is removed by filtration.

This procedure is repeated using additional 2-methyl-5-nitrobenzenesulfonamide (17.0 g., 0.86 mole, 0.48 eq.). The combined products are dissolved in aqueous sodium carbonate (150 ml. 0.3 M). The carbonate solution is filtered and the filtrate acidified with sulfuric acid (8 N). A cream-colored solid precipitates and is removed by filtration and dried. There is obtained 28.5 g. (80%) of a cream-colored solid, melting point 209–211° C. (The literature reports 6-nitrosaccharin as melting at 208–209° C.)

(C) Hydrogenation of 6-nitrosaccharin to 6-amino-saccharin 6-nitrosaccharin (10.0 g., 0.044 mole), 5% palladium-on-carcoal (1.0 g.) and absolute ethanol (350 ml.) are placed in a Parr bottle. The bottle is placed in the Parr apparatus, flushed three times with hydrogen and filled with hydrogen to a pressure of 43 p.s.i.g. The mixture is agitated for fifteen to thirty minutes, during which time the pressure drops to about 32 p.s.i.g. The bottle is again filled with hydrogen (43 p.s.i.g.) and agitation continued for thirty minutes. Then, the catalyst is removed by filtration and the filtrate evaporated to dryness in vacuo. The solid residue is recrystallized from ethanol and dried. There is obtained 8.3 g. (93%) of a light-yellow solid, melting point 291–293° C. (The literature reports 6-aminosaccharin as melting at 283–285° C.)

The intrinsic viscosity of 6-aminosaccharin in dimethylformamide at 20° C. is found to be 0.002 dl./g.

(D) Preparation of triethylammonium 6-aminosaccharinate 6-aminosaccharin (1.0 g., 0.005 mole) is dissolved in a mixture of benzene (100 ml.) and ethanol (100 ml.). Triethylamine (0.5 g., 0.035 mole) is added, and the solvent is evaporated in vacuo. There is obtained 1.3 g. (87%) of a cream-colored solid, melting point 177–180° C. The sample is polymerized by raising the temperature above the melting point.

*Analysis.*—Calcd. for $C_{12}H_{21}N_3SO_5$ (percent): C, 52.15; H, 7.07; N, 14.04. Found (percent): C, 52.61; H, 8.97; N, 13.68.

(E) 2-nitro-2-sulfobenzoic acid

A mixture of 50.0 g. (0.05 mole) of sodium dichromate, 31.3 ml. concentrated sulfuric acid and 21 ml. water are placed in a two-liter, three-neck flask equipped with a condenser and a mechanical stirrer. The reaction vessel is immersed in a 50° C. water bath and 17.0 g. (0.076 moles) of 4-nitrotoluene-2-sulfonic acid is introduced in three portions. With vigorous stirring, 55 ml.

of concentrated sulfuric acid is added slowly. A vigorous reaction occurs when about 60% of the concentrated sulfuric acid has been added. The resulting clear green reaction mixture is stirred at 50° C. for three hours. The reaction mixture is then quenched in 200 g. of ice and a clear dark-green solution is obtained which is cooled in a refrigerator overnight and greenish-white needles separate out. The solid is removed by filtering through a sintered glass filter. There is obtained a slightly greenish-white solid, which melts partly at 138–140° C. and partly at 215–220° C. This greenish-white solid is dissolved in a minimum amount of concentrated sulfuric acid and then quenched in ice to give a white solid in 45% yield (8.68 g.), melting point 138–140° C. Its infrared spectrum in Nujol shows an intense carboxyl cabonyl absorption at 1730 cm.$^{-1}$.

(F) Preparation of 6-nitro-sulfobenzoic anhydride (a) By the action of acetic anhydride.—The nitrodiacid prepared in Example I(E) (2.0 g., 0.008 mole) is refluxed with 12 ml. (0.12 mole) of acetic anhydride in a 60 ml. round bottom flask. The reaction mixture gradually turns dark brown in color. After refluxing for two hours, the excess acetic anhydride is removed under reduced pressure. The resulting brown residue is recrystallized from benzene to give a yellow solid in 70% yield (1.5 g.), melting point 108–110° C. After recrystallization from benzene, the light-yellow solid melts at 110–112° C. Its infrared spectrum shows an intense anhydride carbonyl absorption at 1830 cm.$^{-1}$ and it has a neutralization equivalent of 1.92 (calculated value 2.0).

(b) By the action of thionyl chloride.—The nitrodiacid of Example I(E) (3.0 g., 0.012 mole) is refluxed in a 100 ml. round bottom flask with 30 ml. (0.42 mole) of thionyl chloride for five hours. The resulting clear yellow solution is quenched with ice and an insoluble white solid is removed by filtration. The solid, melting at 113–115° C., is obtained in 83.5% yield (2.3 g.). After recrystallization from benzene the solid melts at 115–117° C.

(G) Hydrogenation of 4-nitrosulfobenzoic anhydride to 4-NH$_2$-sulfobenzoic anhydride Recrystallized nitroanhydride of Example I(F) (2.06 g., 0.009 mole) in 15 ml. of dimethylacetamide is hydrogenated in the presence of 516 mg. of 5% palladium-on-charcoal at 40 p.s.i.g. hydrogen pressure. In a few minutes about one p.s.i.g. of hydrogen pressure is absorbed by the reaction mixture. After one hour, an additional 167 mg. of the catalyst is introduced and the hydrogenation is continued for another hour. In about fifteen minutes, one p.s.i.g. of hydrogen pressure drop is noted. The catalyst is removed by filtration.

A one-ml. portion of the greenish-yellow filtrate (a) is quenched in ice and the solution is stored in the refrigerator overnight. A white solid separates. The solid is found to have a neutralization equivalent of 1.96 on the basis of 4-nitro-2-sulfobenzoic acid·2H$_2$O (calculated value 2.0), and its infrared spectrum in potassium bromide shows an intense carboxyl carbonyl band at 1720 cm.$^{-1}$ and SO$_3$H absorption at 1240 cm.$^{-1}$ and 1000 cm.$^{-1}$. The NH$_2$ absoption at 2900–3100 cm.$^{-1}$ region is not sharp. There are no NO$_3$ absorptions present at 1530 cm.$^{-1}$ and 1340 cm.$^{-1}$. The white solid appears to be impure 4-aminosulfobenzoic acid. On addition of 15 ml. of benzene to a one-ml. portion of the filtrate (a), a greenish oil separates. However, on addition of 30 ml. of dry acetone to one-ml. portion of the filtrate (a), there precipitates a yellow solid (b) which melts partly at 120° to 165° C. and finally completely at 310° C. Titration of a portion of the solid indicates that it is a mixture of dimeric or trimeric compounds.

The infrared spectrum of the solid (b) in potassium bromide shows an intense amide N-H absorption at 3600 cm.$^{-1}$, a broad band due to amide I (C=O) and amide II absorptions around 1650–1580 cm.$^{-1}$, a broad SO$_3$H absorption at 1230 cm.$^{-1}$ and 1080 cm.$^{-1}$, and a broad SO$_2$N absorption at 1160 cm.$^{-1}$. The secondary amide NH out-of-plane deformation at 708 cm.$^{-1}$ (amide V) is also present.

(H) Preparation of 4-aminobenzenedisulfonyl anhydride

The procedure of Example I(A) is used to replace the amino group of 2-sulfo-4-nitroaniline (prepared by sulfonation of 4-nitroaniline) with a sulfonamide group, and the resulting compound is converted to 4-nitrobenzenedisulfonyl anhydride by acidifying and refluxing with acetic anhydride as in Example I(F). The recrystallized 4-nitrobenzenedisulfonyl anhydride (2.03 g., 0.00768 mole) in 15 ml. of dimethylacetamide is hydrogenated in the presence of 0.516 g. of 5% palladium-on-charcoal at 40 p.s.i.g. hydrogen pressure for one hour. The pressure drop is about 2 p.s.i.g. The black catalyst becomes grey, indicating some material is adsorbed on the catalyst. The catalyst is removed by filtration, leaving a yellowish-orange solution.

A one-ml. portion of the solution is quenched with ice and stored in a refrigerator overnight. There is no percipitation. A one-ml. portion of the filtrate is mixed with about 10 ml. of acetone and there is obtained a flocculent white solid (a). Its infrared spectrum in potassium bromide shows SO$_3$H absorptions at 1240 cm.$^{-1}$ and a shoulder due to SO$_2$N absorption at 1190 cm.$^{-1}$. There is no NO$_2$ absorption band. Half of the solution is concentrated at 50° C./1 mm. Hg. There is obtained 0.25 g. of a pink solid (b) which softens at 195° C. and melts at 200–205° C. Its infrared spectrum in potassium bromide is similar to that of the solid (a).

The recovered catalyst is extracted with 10 ml. of dimethylacetamide three times at room temperature. The dark-brown extracts are combined and the dimethylacetamide is removed at 55° C./1 mm. Hg. There remains 0.8 g. of purple solid (c). Its infrared spectrum is similar to that of (a). The purple solid had an intrinsic viscosity of 0.075 dl./g. in dimethylacetamide at 20° C.

(I)

The procedure of Example I(H) is repeated using in place of the 4-nitrobenzenedisulfonyl anhydride, an equivalent amount of 4-nitronaphthalene-1,2-disulfonyl anhydride to give the corresponding reduced and polymerization products. Likewise when 4'-nitrodiphenyl-3,4-disulfonyl anhydride is used, corresponding results are obtained.

(J)

The procedures of Examples I(A)–(C) are repeated to prepare 5-aminosaccharin by starting with 2-Me-4-NO$_2$-benzenesulfonamide instead of 2-Me-5-NO$_2$ benzenesulfonamide. The 5-NH$_3$-saccharin product is a yellow solid having a melting point of 291–293° C. (Literature reports M.P. of 291–293° C.) When this product is heated above its melting point, or in a trimethylamine-water mixture, or in polyphosphoric acid, it undergoes polymerizations similar to 6-aminosaccharin.

EXAMPLE II

A series of tetrafunctional monomers is prepared for use in the preparation of the polymers of this invention.

(A) Synthesis of m-xylene-4,6-disulfonamide m-Xylene (50 g., 1.47 mole) is added slowly with stirring to 400 ml. of chlorosulfonic acid in a 2-liter, three-neck, round-bottom flask, equipped with a mechanical stirrer, a condenser a thermometer and connected to a mineral oil trap as a gas outlet. The temperature of the mixture rises to about 60° C. in the course of the addition of the m-xylene. Then the temperature is raised slowly to 1110° C. and maintained at that temperature for thirty minutes. The mixture is then cooled to about 25° C. and poured onto crushed ice. An oil separates which acidifies on standing. The solid is removed by filtration, dried in a vacuum oven overnight and then recrystallized from ether and dried in a vacuum oven at room temperature. The yield of m-xylene-4,6-disulfonyl chloride is 97% of theoretical and this has a melting point of 120–121° C. (The literature reports a melting point of 123° C.)

Then 140.0 g. of m-xylene-4,6-disulfonyl chloride is dissolved in one liter of benzene and 600 ml. of 5 N alcoholic ammonia solution is added with stirring. The addition of the ammonia solution is such as to assure that the solution is basic at all times. A white solid separates which is removed by filtration, and it is washed thoroughly with water to free it from ammonium chloride. The crude sulfonamide is then purified by recrystallization from 10% ethanol solution. About 10.0 g. of a residue, insoluble in 10% ethanol, and melting at 275–280° C. is obtained as a byproduct and is discarded. This is probably a sulfone formed as a byproduct of the reaction. The pure sulfonamide is obtained as needle-shaped white crystals.

The yield of m-xylene-4,6-disulfonamide is 76% of the theory and the melting point is found to be 255–258° C. (The literature reports 249° C.) The infrared spectrum shows the absorption characteristics of the $SO_2NH_2$ groups at $7.6\mu$.

(B) Oxidation of m-xylene-4,6-disulfonamide to m-bisaccharin

Sodium dichromate (22.5 g.) is added to a cold mixture of 21.0 g. of water and 57.6 g. of sulfuric acid (Sp. Gr. 1.84) in a two-liter, three-neck, round-bottom flask equipped with a mechanical stirrer and a condenser. After mixing the ingredients, the flask is placed in a thermostatically-controlled bath maintained at 54° C. and the contents are stirred for two to three minutes. m-Xylene-4,6-disulfonamide (11.0 g., 0.0415 mole) is added to the mixture in the flask very slowly while the mixture is stirred vigorously. Then, after one or two minutes, 102.0 g. of sulfuric acid (Sp. Gr. 1.84) is added slowly to the mixture from a dropping funnel. The reaction starts immediately and proceeds smoothly. Stirring is continued for thirty minutes and the brown-red color of the solution turns green. Then the mixture is poured onto crushed ice. A white product precipitates and is separated by filtration. The residue obtained is dissolved in aqueous sodium carbonate solution and is precipitated by adding sulfuric acid. This is repeated once more to purify the product. The "m-bisaccharin" obtained is dried and weighed. The yield of the product is 84% of theoretical and the melting point is found to be 405–410° C. (with decomposition) by differential thermal analysis. The "m-bisaccharin" is soluble in water and in aqueous sodium carbonate solution.

Analysis.—Calc'd for $C_8H_4O_6S_2N_2$ (percent): C, 33.30; N, 9.70; H, 1.40; S, 22.20. Found (percent): C, 32.59; N, 8.81; H, 1.40; S, 22.12.

The infrared spectrum shows the absorption characteristics of N—H at $3.4\mu$, $SO_2$—N at $8.44\mu$ and carbonyl groups at $6.9\mu$ "m-Bisaccharin." (0.2557 g.) is dissolved in water and titrated with 0.0838 N sodium hydroxide solution using a Beckman pH meter. From the plot of sodium hydroxide (ml.) versus pH the endpoint is obtained. On the basis of the titration results "m-bisaccharin" is found to have a neutralization equivalent equal to 1.98 (calculated equivalent 2.0).

(C) Synthesis of diethyl-4,6-disulfamidoisophthalate

A 5.0 g. portion of "m-bisaccharin" suspended in 130 ml. of absolute ethanol is saturated with hydrochloric acid gas at 5° C. The solution is filtered and the filtrate is evaporated to dryness under reduced pressure. The ethyl ester is thus recovered and is purified by washing first with water to remove any m-bisaccharin present and then with absolute ethanol. Some unreacted "m-bisaccharin" insoluble in ethanol, is also recovered as a residue. The ester is soluble in ethanol and insoluble in water. The melting point of the ester is found to be 230–232° C. and the yield is 62% of theoretical. A purified and dried sample is analyzed.

Analysis.—Calc'd for $C_{12}H_{16}O_8S_2N_2$ (percent): C, 37.90; N, 7.36; S, 16.83; H, 4.21. Found: (percent) C, 37.27; N, 7.90; S, 17.23; H, 4.08.

The infrared spectrum shows the characteristic absorptions for $SO_2N_2$ at $7.5\mu$ and $8.64\mu$, and also for ester carbonyls at $5.94\mu$.

(D) Synthesis of m-tetraacid from m-bisaccharin modified acid hydrolysis of m-bisaccharin "m-Bisaccharin" (6.05 g., 0.021 mole) is mixed with 52.5 ml. of 12 N hydrochloric acid in a three-neck, round-bottom flask equipped with a mechanical stirrer, a condenser and a thermometer. The mixture is heated to 60–65° C. and maintained at that temperature for thirty minutes. Foaming and evolution of gases occurs. Then, for a dropping funnel, 5.6 ml. of nitric acid (90%) is added slowly to the mixture. After the nitric acid has been added the mixture is heated to 90–95° C. and maintained at that temperature for four hours. After three hours of heating, the solution becomes clear. The heating is continued for another hour to insure complete reaction. Then the solution is filtered to remove impurities and unreacted bisaccharin. The clear filtrate is evaporated at reduced pressure until it appears completely free from fumes and the residue dried in a vacuum oven for fifteen hours. On cooling the resultant viscous mass becomes a white solid. The yield of crude material is 97% of theoretical (on the basis of tetrahydrate). The crude "m-tetraacid" is kept over phosphorus pentoxide in a vacuum dessicator for fifteen days to remove any free moisture present. The melting point of the dried tetraacid is found to be 110–112° C.

Analysis.—Calc'd for $C_8H_6O_{10}S_2 \cdot 4H_2O$ (percent): C, 24.15; H, 3.52; S, 16.10. Found (percent): C, 24.47; H, 3.58; S, 16.31.

"m-Tetraacid," 0.100 g. (previously dried over phosphorus pentoxide), is titrated with standard sodium hydroxide solution using a Beckman pH meter. The tetraacid is found to have a neutralization equivalent of 4.08 on the basis of the tetrahydrate (calculated equivalent 4.0).

Thermogravimetric analysis on a portion of the solid tetraacid is also carried out at a heating rate of 2° C. per minute, which indicates the loss of about four water molecules per molecule of tetraacid up to 125° C.

The infrared spectrum of the "teeraacid" is recorded as a KBr disc, shows distinct absorptions for COOH at $6.1\mu$ and also for $SO_3H$ at $8.1\mu$ and $9.4\mu$.

(E) Synthesis of m-bianhydride from m-tetraacid

Five g. (0.0152 mole) of the "m-tetraacid" is treated with 25 ml. (26.5 g., 0.34 mole) of acetyl chloride and refluxed for five hours in a round-bottom flask equipped with a reflux condenser and a calcium chloride drying tube. The tetraacid is found to react with acetyl chloride and foaming is observed initially. After the reaction is over, the solids are removed by filtration and recrystallized from dried benzene (dried over sodium) avoiding exposure to atmosphere as far as possible (m-bianhydride absorbs moisture very quickly and is converted to tetraacid). Beautiful needle-shaped white crystals, melting at 265–267° C., are obtained. The filtrate is distilled under vacuum and a dark-brown semisolid material is obtained. The drak-brown semisolid material is recrystallized in the same way and a small additional portion of m-bianhydride is recovered from it. The yield of m-bianhydride is 80% of the theory. The "m-bianhydride" prepared is preserved in a dessicator under vacuum over phosphorus pentoxide. It has been observed that the m-dianhydride is unstable to moisture; when exposed to air it absorbs moisture and is converted to the acid form. Special precaution has to be taken to avoid exposure to air in the preparation of an analytical sample of m-bianhydride. An analytical sample of bianhydride is prepared in the following way.

A portion of m-bianhydride prepared as described above is treated with an excess of fresh acetyl chloride and refluxed for five to six hours in a round-bottom flask equipped with a calcium chloride drying tube. The solids are removed by filtration and placed immediately in an Abderhalden drying pistol. After drying for five to six hours under vacuum, a portion of the solid is immediately sealed in an ampoule under high vacuum to await analysis. Another portion is immediately titrated with standard sodium hydroxide solution using a Beckman pH meter. The infrared spectrum is also immediately recorded.

*Analysis.*—Calc'd for $C_8H_2S_2O_8$ (percent): C, 33.05; H, 0.63; S, 22.01. Found (percent): C, 33.16; H, 0.95; S, 21.64.

From the titration result m-bianhydride is found to have a neutralization equivalent equal to 3.96 (calculated equivalent 4.0). The infrared spectrum shows distinct doublet at about $5.5\mu$ characteristic of the anhydride carbonyl group and absorption for the carboxy carbonyl group at about $6.0\mu$ is negative.

(F) Preparation of naphthalenedisaccharin compound

The procedures of Examples II(A)–(E) are repeated using in place of the m-xylene, an equivalent amount of 2,6-dimethylnaphthalene to give the corresponding naphthalenedisaccharin compound and the corresponding tetraacid, bianhydride and diethylsulfamidonaphthalenedicarboxylate are also prepared.

(G) Preparation of bisaccharin compound from 1,5-dimethylnaphthalene

The procedures of Examples II(A)–(E) are repeated using in place of the m-xylene an equivalent amount of 1,5-dimethylnaphthalene to give the bisaccharin compound and the corresponding derivatives thereof.

(H) Preparation of bisaccharin compound from 4,4'-dimethyldiphenyl

The procedures of Examples II(A)–(E) are repeated using in place of the m-xylene an equivalent amount of 4,4'-dimethyldiphenyl in place of the m-xylene to give the bisaccharin compound and the corresponding derivatives.

(I) Preparation of bisaccharin compounds from 4,4'-dimethyl derivatives of diphenyl compounds The procedure of Example II(H) is repeated a number of times using in place of the diphenyl compounds as a starting material, an equivalent amount respectively of a corresponding 4,4' - dimethyl derivative of diphenyloxide, diphenylsulfide, diphenylamine, diphenylsulfone, diphenylsulfoxide, diphenylketone and the diphenylmethane. In each case derivatives are obtained corresponding to those obtained in Example II(H) except that the basic diphenyl structure is replaced by the nuclear structure in the starting material.

(J) Preparation of 3,3'-benzidine disulfonic acid

In a 100-ml. three-neck, round-bottom flask, there are placed 4 ml. of water and 1.2 ml. (0.2 mole) of concentrated sulfuric acid. The solution is heated to 60° C. and to this, 18.4 g. (0.1 mole) of benzidine (4,4'-diaminodiphenyl) is added in portions with stirring. The mixture becomes a pink-colored slurry. An additional 6 ml. of water is added to the slurry and the temperature of the slurry is raised to 120° C. After heating at 120° C. for one hour, most of the water distills off. The reaction mixture is cooled to 100° C. and then heated at 180° C. for three hours under 12 mm. Hg pressure. The resulting black mass is heated to 230° C. and this temperature is maintained for three hours.

The black residue (35 g.) is ground and dissolved in 200 ml. of 3 N ammonium hydroxide and an insoluble black material is removed by filtration. The brown filtrate is acidified with 200 ml. of 6 N hydrochloric acid and the grey solid which is separated weighs 30.0 g. (80% yield).

A small sample of the grey solid is titrated with a standard sodium hydroxide solution. The neutralization equivalent of the solid is found to be 2.04 for a dihydrate form (calculated equivalent 2.0). The grey solid is purified by redissolving in 3 N ammonium hydroxide and then acidified with concentrated hydrochloric acid. There is obtained 25.0 g. of a greyish-white solid. Its neutralization equivalent is found to be 1.96 (calculated equivalent 2.0). Its infrared spectrum shows bands characteristic for $SO_3H$ at 1240 cm.$^{-1}$ and 1100 cm.$^{-1}$. Thermogravimetric analysis shows no weight loss up to 140° C., indicating that the disulfonic acid is in the anhydrous form. Differential thermal analysis shows an endotherm at 325° C.

(K) Preparation of diphenyl 3,3',4,4'-tetrasulfonic acid from 3,3'-benzidinesulfonic acid 3,3'-benzidinedisulfonic acid (10.0 g., 0.029 mole) is dissolved in a solution of 4.0 g. of sodium hydroxide in 50 ml. of water to give a brown solution. To the cooled brown solution is added a saturated sodium nitrite solution (4.7 g. in 14 ml. of water). It is allowed to stand in ice water bath for fifteen minutes and the mixture is poured onto a mixture of 30 ml. of concentrated hydrochloric acid and 50.0 g. of ice with occasional shaking. Care is taken to keep the temperature of the acidic solution below 5° C. during the addition of the reaction mixture. The acidic solution is cooled in an ice-water bath for one-half hour and the insoluble material is removed by filtration. There is obtained 10.0 g. (94% yield) of the bright orange-brown tetrazonium compound.

The orange-brown solid is dissolved in 100 ml. of concentrated hydrochloric acid. The resulting brown solution is slowly added over a thirty minute period with occasional shaking, to a suspension of 1.5 g. cuprous chloride in 130 ml. of a fresh solution of 20% sulfur dioxide-acetic acid solution. Vigorous foaming occurs immediately, indicating the liberation of nitrogen. The reaction mixture is then allowed to stand at room temperature for several hours and evaporated to dryness. The titration of a portion of the resulting brown residue with standard sodium hydroxide solution shows that the brown residue has a neutralization equivalent of 3.88 for an anhydrous form (calculated value 4.0).

(L) Preparation of benzene tetrasulfonic acid

The procedure of Examples II(J) and (K) is repeated using in place of benzidine an equivalent amount of p-phenylenediamine. The corresponding benzene tetrasulfonic acid and its derivatives are obtained.

(M) Preparation of tetrasulfonic acids using 4,4'-diamine derivatives of diphenyl compounds The procedure of Examples II(J) and (K) is repeated a number of times using in place of the benzidine an equivalent amount respectively of the corresponding 4,4'-diamine derivatives of diphenyloxide, diphenylamine, diphenylsulfide, diphenylsulfone, diphenylsulfoxide, diphenylketone and diphenylmethane. In each case derivatives are obtained corresponding to those obtained in Example II(J) except that the basic diphenyl structure is replaced by the nuclear structure in the starting material.

(N) Preparation of tetrasulfonic acid from 2,5-diaminonapthalene

The procedure of Examples II(J) and (K) is repeated using in place of the benzidine an equivalent amount of 2,5-diaminonaphthalene. The resultant product is a mixture of the 1,2,5,6- and 1,4,5,8-tetrasulfonic acid derivatives of naphthalene both of which are compounds useful in preparing the polymers of this invention.

(O) Preparation of tetrasulfonic acid from p-aminotoluene

The procedure of Examples II(J) and (K) is repeated using in place of the benzidine an equivalent amount of p-aminotoluene. The resultant toluene trisulfonic acid is oxidized according to the procedure of Example II(B) to give benzene-1-carboxyl-2,4,5-trisulfonic acid. Repetition of this procedure using corresponding appropriate amine-methyl derivatives of naphthalene, diphenyl, diphenyloxide, etc. give the corresponding monocarboxylic trisulfonic acid compounds useful in preparing the polymers of this invention.

(P) Preparation of peri derivatives of naphthalene 1,4,5,8-tetramethylnaphthalene is oxidized according to the oxidation procedure of Example II(B) and the resultant tetracarboxylic acid is converted to the dicyclimide by standard procedure for converting p-dicarboxylic acids to the corresponding cyclimides. The dicyclimide is then converted to the corresponding diaminodicarboxylic acid by the Hofman reaction which gives a mixture of the 1,4-dicarboxylic-5,8-diamino and the 1,5-dicarboxylic-4,8-diamino naphthalene isomers. Then the procedure of Examples II(J) and (K) is used to convert these isomers to naphthalene-1,4-dicarboxyl-5,8-disulfonic acid and naphthalene-1,5-dicarboxyl-4,8-disulfonic acid. These peri derivatives are converted to the corresponding dicyclicimides of the bisaccharin type by conversion to the amides with subsequent ring closure according to standard procedures for producing saccharin type ring closure. The corresponding dianhydrides and diesters are also prepared according to the procedures described above.

EXAMPLE III

Polymerization of 6-aminosaccharin in the presence of triethylamine 6-aminosaccharin (2.00 g., 0.155 mole), triethylamine (1.813 g., 0.00804 mole) and water (2.80 g., 0.155 mole) are placed in a polymerization tube. The tube is flushed with nitrogen. During polymerization the effluent gas is passed through a trap containing 150 ml. of 0.0943 N sulfuric acid. The contents of the tube are refluxed at 100° C. for two and one-half hours, during which period the water distills out and the solution becomes viscous, and orange-brown in color. The temperature is then raised and heating is continued at 170° C. for two and one-half hours and then at 190° C. for seventeen hours, yielding an orange-brown resinous material, 2.26 g. It is insoluble in water, but readily soluble in dimethylacetamide, forming a yellow solution. The product softens at 110° C. and melts completely at 128° C. giving a viscous, orange-brown melt. From the titration of the excess acid in the trap with standard sodium hydroxide (0.1198 N), it is found that 49% (0.00394 mole) of triethylamine still remains in the polymer.

The orange polymer is ground in a mortar with a pestle, reinserted in the polymerization tube and heated at 190° C. at 34 mm. Hg pressure for three hours. The resulting reddish-orange solid melts in the range of 130–135° C. and its intrinsic viscosity is found to be 0.120 dl./g. in dimethylacetamide at 20° C. Then heating of the reddish-orange solid is continued at 190° C. at 34 mm. Hg pressure for an additional seventeen hours, and there is obtained a brown solid which softens at 133° C. and melts completely at 175° C. The brown polymer is then heated at 190° C. for two hours at 760 mm. Hg and at 190° C./ 42 mm. Hg for three and one-half hours. During the heating at 42 mm. Hg foaming occurs. The resulting brick-brown polymer melts completely at 190° C. and has an intrinisic viscosity of 0.285 dl./g. in dimethylacetamide at 20° C. Then, heating of the polymer is continued at 190° C. under 25 mm. Hg for four hours. The polymer (2.1 g., 105%) is still soluble in dimethylacetamide and its intrinsic viscosity at this state is 0.431 dl./g. in dimethylacetamide and 0.349 dl./g. in dimethylformamide at 20° C. The reaction is terminated at this time.

The infrared spectrum of the final polymer shows an intense $SO_2NH_2$ absorption at 1330 cm.$^{-1}$ and an intense $SO_2N$ absorption at 1170 cm.$^{-1}$. A sharp and intense absorption band at 1610 cm.$^{-1}$ characteristic of an amide carbonyl group is also present. The polymer at this stage is of the open repeating unit structure. The differential thermal analysis of the dimethylacetamide-soluble polymer shows a sharp endotherm at 584° C. and several broad endotherms in the region of 300° C. to 500° C.

EXAMPLE IV (1) Post-heating of hemi-polymers at 350° C. for one hour

The hemipolymer (0.6216 g., intrinsic viscosity 0.431) of Example I is placed in a polymerization tube. The tube is flushed with nitrogen and heated at 350° C. for one hour under a slow stream of nitrogen, and an amine-like odor is noted in the nitrogen exit gas. There is obtained 0.5681 g. (91.0%) of a black solid. The polymer is slightly soluble in dimethylacetamide and very soluble in concentrated sulfuric acid. This polymer shows no weight loss up to 400° C. in nitrogen, a 16% loss at 600° C., and a 37% loss at 1100° C. by thermogravimetric analysis. Infrared analysis shows a substantial amount of thiazone structure.

(2) Post-heating at 400° C. for one hour

The hemipolymer (0.4597 g., intrinsic viscosity 0.431) of Example I is heated at 400° C. for one hour according to the method described above. Evolution of amine gas is noted and there is obtained 0.336 g. (73%) of a black solid which is insoluble in dimethylacetamide but slightly soluble in concentrated sulfuric acid. This polymer shows no weight loss up to 450° C. in nitrogen, only a 10% weight loss at 600° C. and a 32% loss at 1100° C. by thermogravimetric analysis.

(3) Post-hearing at 400° C. for one hour and 420° C. for three hours

The post-heated, black polymer (0.1119 g.), obtained by the procedure of the preceding paragraph (2) is heated at 420° C. for three hours under a slow stream of nitrogen and the evolution of amine is noted. There is obtained an insoluble black solid (a) in 86% yield (0.0966 g.). The polymer is insoluble in both dimethylacetamide and concentrated sulfuric acid. This polymer (a) shows no weight loss up to 450° C. in nitrogen, only a 7% weight loss at 600° C., and a 31% loss at 1100° C. by thermogravimetric analysis. When the polymer heated to 1100° C. in nitrogen in the thermogravimetric apparatus is recycled under nitrogen, there is obtained a substantially linear plot of weight versus temperature. When the polymer is heat-treated to 1100° C. and recycled in air it shows no weight loss up to 410° C. a 26% loss at 600° C. and a total loss at 750° C.

The dimethylacetamide-insoluble, black polymer (a) of the preceding paragraph is also subjected to thermogravimetric analysis in air and shows no weight loss up to 350° C., a 44% loss at 600° C. and a total loss at 730° C. A small amount of basic gas is evolved when the polymer (a) of the preceding paragraph is heated around 500–700° C. in the thermogravimetric apparatus. Infrared analysis showing increasing proportions of thiazone structure produced by the successive heating steps.

EXAMPLE V

Post-heating poly-6-aminosaccharin at 400° C. for one hour

Poly-6-aminosaccharin (intrinsic viscosity 0.215; 0.2 g.), prepared according to Example I at 200° C. for twenty hours using trimethyl amine catalyst, is placed in a polymerization tube. The tube is flushed with nitrogen and heated to 400° C. for one hour. Some obnoxious gas, related in odor to the thionylalkylamines, is evolved and there is obtained 0.19 g. (95%) of a black solid. This solid is insoluble in dimethylformamide.

This polymer shows no weight loss up to 450° C. in nitrogen, and shows only a 10% weight loss at 550° C. by thermogravimetric analysis. Infrared analysis shows a substantial amount of thiazone structure.

EXAMPLE VI

The procedure of Example III is repeated a number of times to produce polymers having well over one percent of thiazone repeating unit structures using individually in place of the polymer of that example equivalent amounts respectively of hemipolymers of:

(a) 2-sulfo-4-aminobenzoic acid;
(b) The diamide of 2-sulfo-4-aminobenzoic acid;
(c) 3-sulfo-5-amino-1-naphthoic acid;
(d) 4-(p-aminophenyl)-2-sulfo-benzoic acid;
(e) 4-(aminophenoxy)-2-sulfo-benzoic acid;
(f) 4-(p-aminophenylthio)-2-sulfo-benzoic acid imide;
(g) N-phenyl-6-aminosaccharin;
(h) 4-(p-aminophenyacyl)-2-sulfobenzoic acid;
(i) 3-amino-8-sulfo-1-naphthoic acid;
(j) 4-amino-8-sulfo-1-naphthoic acid;
(k) 5-amino-1,8-naphthalene disulfonic acid

EXAMPLE VII

Polymerization of m-bisaccharin with p-phenylenediamine in triethylamine (In 1:0.8 mole ratio of m-bisaccharin to triethylamine)

A mixture of m-bisaccharin (1.83 g., 0.00635 mole), p-phenylenediamine (0.683 g., 0.00635 mole), triethylamine (0.978 g., 0.0097 mole) and water (3.30 g., 0.183 mole) are placed in a polymerization tube. The effluent gas is passed throug a trap containing 150 ml. of 0.0943 N sulfuric acid. The mixture is refluxed at 100° C. for two and one-half hours under a slow nitrogen stream yielding an orange-brown solution. The solution is heated at 150° C. for two and one-half hours during which period the water is distilled from the reaction mass. Then the resulting orange-brown resinous material is heated at 170° C. for two and one-half hours and then at 190° C. for fourteen hours. On cooling, there is obtained a shiny, brown polymer which melts partly in the region of 220–230° C., but does not melt completely even at 300° C. It is insoluble in water, but soluble in dimethylacetamide. Its intrinsic viscosity at this stage is found to be 0.88 dl./g. in dimethylacetamide at 20° C.

The brown polymer is then heated at 230° C. for two hours and there is obtained 2.66 g. (106%) of a shiny, dark-brown solid having an intrinsic viscosity of 0.181 dl./g. in dimethylacetamide at 20° C. The dark-brown polymer does not melt when heated to 300° C. Its infrared spectrum shows an intense amide carbonyl absorption at 1620 cm.$^{-1}$ and a broad C–N absorption at 1270 cm.$^{-1}$.

From the titration of the excess acid in the trap with standard sodium hydroxide (0.1198 N), it is found that 35% (0.0034 mole) of triethylamine still remains bound in the polymer. The structure of the brown black polymer at this stage is:

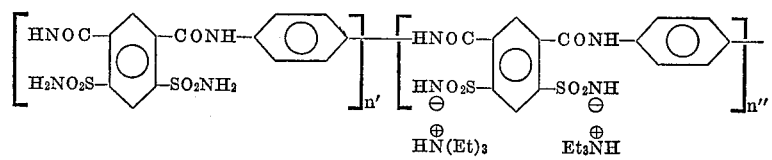

where $n' > n''$.

The differential thermal analysis of the dimethylacetamide-soluble polymer shows a sharp endotherm at 585° C. and several broad endotherms around 400–550° C.

Post-heating at 400° C. for one hour

The hemipolymer (0.4333 g.) is post-heated as above. The evolution of amine-like odor is noted. There is ob-tained 0.3664 g. (84%) of a black solid which is insoluble in dimethylacetamide and very slightly soluble in concentrated sulfuric acid. An infrared spectrum shows substantial amounts of thiazone structure. This polymer shows no weight loss up to 440° C., a 9% weight loss at 600° C. and a 36% weight loss at 1100° C. in nitrogen by thermogravimetric analysis.

Post-heating at 400° C. for one hour and at 420° C. for three hours

The post-heated, black polymer (0.3471 g.) is heated at 420° C. for three hours under a nitrogen stream. Evolution of amine-like odor is noted. There is obtained 0.3246 g. (93%) of an insoluble black solid (a).

The infrared spectrum shows an increased percentage of thiazone structure. This polymer (a) shows no weight loss up to 460° C., a 7% weight loss at 600° C. and a 35% weight loss at 1100° C. in nitrogen. When the polymer heat-treated to 1100° C. is recycled in nitrogen, no weight loss is observed. When the polymer is recycled in air, it shows no weight loss up to 400° C., an 11% weight loss at 600° C. and a total loss at 790° C. This polymer is also subjected to the thermogravimetric analysis in air and shows no weight loss up to 420° C., a 45% loss at 600° C. and a total loss at 680° C. Some basic gas is evolved when the polymer (a) is heated between 300° C. and 700° C. in the thermogravimetric apparatus.

EXAMPLE VIII

1:1.6 mole ratio of m-bisaccharin to triethylamine m-Bisaccharin (1.44 g., 0.005 mole), p-phenylenediamine (0.542 g., 0.005 mole) triethylamine (0.808 g., 0.008 mole) and water (2.30 g., 0.13 mole), are placed in a polymerization tube. The tube is heated at 150° C. for two hours under a nitrogen stream. The effluent gas is passed through a trap containing 100 ml. of 0.0943 N sulfuric acid. During heating the water distills slowly from the clear, orange-brown solution; then the contents are heated at 200° C. for one hour and finally at 230° C. for eighteen hours. During the latter heating period, some foaming is noted. From titration of the excess acid in the trap with standard sodium hydroxide (0.1030 N), it is found that 25.5% (0.002 mole) of triethylamine still remains in the polymer mass. The trap is replaced with one containing 25 ml. of 0.0943 N sulfuric acid and the heating is continued for an additional seven hours. The contents of the trap are titrated with standard sodium hydroxide (0.1030 N). There is obtained 1.97 g. (99.5%) of a glassy, brown-black solid. This polymer is found to have an intrinsic viscosity 0.171 dl./g. in dimethylacetamide at 20° C. The plot of $\eta_{sp}/c$ versus $c$ gives a straight line with a negative slope. The polymer is insoluble in water, but slightly soluble in dimethylacetamide. The infrared spectrum of the polymer as a KBr disc is identical to that of Example V.

EXAMPLE IX

In polyphosphoric acid

A mixture of m-bisaccharin (2.88 g., 0.001 mole), p-phenylene-diamine (1.09 g., 0.001 mole) and polyphosphoric acid (120 g.) is placed in a 250 ml. three-neck, round-bottom flask, equipped with a heater, thermometer and stirrer, and adapted for removal of samples. The mixture is heated from room temperature to 160° C. within an hour; then this temperature is maintained for a period of ten hours. The color of the mixture turns gradually from white to grey and to dark grey. The dark grey mixture is then heated, with stirring, at 175–180° C. for fifty-five hours. The dark grey mixture becomes green in color and finally develops the appearance of a dark bluish-green paste. Samples are withdrawn at the end of six-hour, thirteen-hour, twenty-hour, twenty-seven hour, thirty-two hour, forty-four-hour and fifty-five-hour periods. Each sample is mixed with cold methanol and the methanol-insoluble grey material which precipitates is separated by filtration, washed with methanol and dried. In every case, the grey polymer is insoluble in water, slightly soluble in dimethylacetamide, but very soluble in concentrated sulfuric acid. The change in intrinsic viscosity as a function of reaction time is as follows:

| | Time in hours | $[\eta]$ dl./g. in concentrated $H_2SO_4$ |
|---|---|---|
| Temperature, ° C.: | | |
| 180 | 20 | 0.115 |
| 180 | 32 | 0.135 |
| 180 | 55 | 0.155 |

The remaining portion of the reaction mixture is heated at 185–190° C. for eighteen hours. At the end of eighteen hours of heating, some granulation in the solution is noted. Samples are withdrawn at seven hours (a), fourteen hours (b), and eighteen hours (c). After isolation of the polymer by procedures similar to those given above, samples (a) and (b) are in the form of a dark-green fluffy product which are slightly soluble in concentrated sulfuric acid. From sample (c) there is obtained a greenish-black solid which is no longer soluble in concentrated sulfuric acid. The infrared spectrum of the greenish-black polymer (c) is quite simple and shows a broad $SO_2N$ absorption at 1180 cm.$^{-1}$, indicating that substantial ring closure has occurred.

EXAMPLE X

Polymerization of m-bisaccharin with benzidine in triethylamine m-Bisaccharin (1.45 g., 0.005 mole), recrystallized benzidine (0.926 g., 0.005 mole), triethylamine (0.792 g., 0.008 mole) and water (2.29 g., 0.13 mole) are placed in a polymerization tube. The polymerization is performed according to the procedure of Example V. There is placed in a trap 10 ml. of 0.0943 N sulfuric acid. The polymerization tube is flushed with nitrogen and the yellowish-orange reaction mixture is heated at 150° C. for two hours and then at 170° C. for one hour. During heating, the water is distilled slowly. The resulting orange-brown residue changes to reddish-brown and then to dark brown, accompanied by some foaming. There is obtained 2.44 g. (102%) of a glassy reddish-brown solid. From titration of the excess acid in the trap with standard sodium hydroxide (0.1198 N), it is found that the polymer mass contains about 17% (0.0014 mole) of the triethylamine employed. The glassy purple-brown solid is insoluble in water, but somewhat soluble in dimethylacetamide. The intrinsic viscosity of the reddish-brown solid is found to be 0.155 dl./g. in dimethylacetamide at 20° C. The infrared spectrum is similar to that of the product of Example V. Post-heating at 350° C. for one hour shows substantial thiazone structure upon infrared analysis.

EXAMPLE XI

Polymerization of m-bisaccharin with 3-3'-diaminobenzidine in triethylamine m-Bisaccharin (2.16 g., 0.0075 mole), 3,3'-diaminobenzidine (1.62 g., 0.0075 mole), triethylamine (1.05 g., 0.0104 mole) and water (4.11 g., 0.228 mole) are placed in a polymerization tube; some heat is evolved on mixing, yielding a yellow-colored mixture. The tube is then flushed with nitrogen, and the yellow mixture refluxed at 100° C. for two hours, after which time it is reddish-brown in color. Since a large amount of solid is still undissolved, an additional 0.44 g. (0.0044 mole) of triethylamine is added. The mixture remains heterogeneous; it is heated at 100° C. for another hour, then at 120° C. for two hours. During the latter heating period, the water is distilled slowly from the mixture. Then the temperature is raised to 140° C. and maintained at this temperature for one and one-half hours. The mixture becomes a homogeneous viscous yellow-brown mass which is then heated at 150° C. for one hour, at 160° C. for one hour, and then at 170° C. for one hour, changing in color from a yellow-brown to a reddish brown. The polymer has an intrinsic viscosity of 1.55 dl./g. in concentrated sulfuric acid-dimethyl-acetamide and of 0.147 dl./g. in concentrated sulfuric acid at 20° C. Differential thermal analysis of the polymer also shows a sharp endotherm at 590° C. but an endotherm at 230° C. is missing. Some foaming is observed. Then heating is continued at 180° C. for three and one-half hours. On cooling, there is obtained a yellowish-orange solid which softens partly at 75° C., melts partly at 155–163° C., and completely at 180–190° C. The yellowish-orange solid is then heated at 190° C. for two and one-half hours, during which time some foaming occurs. The temperature is then raised to 200° C. and maintained there for three hours. There is obtained 3.7 g. (98%) of an orange polymer (a) having an intrinsic viscosity of 1.30 dl./g. in dimethylacetamide at 20° C. The orange polymer (a) melts partly at 210–225° C. and completely, with foaming, at 245–255° C. Its infrared spectrum shows an intense absorption characteristic of an amide carbonyl group at 1640 cm.$^{-1}$, an intense $SO_2N$ absorption at 1170 cm.$^{-1}$, and a C—N absorption at 1270 cm.$^{-1}$. A weak $SO_2NH_2$ absorption at 1340 cm.$^{-1}$ is also present. From the titration of the excess acid in the trap, it is found that 36.2% (0.00543 mole) of triethylamine still remains bound in the polymer. This suggests that the polymer at this stage is mainly in the form of the hemipolymer shown as Formula XXV wherein $n'>n''$. The differential thermal analysis of polymer (a) shows two sharp endotherms at 220° C. and 590° C. There are several broad endotherms between 360–580° C.

Post-heating at 350° C. for one hour

The hemipolymer (0.3017 g.) is post-heated at 350° C. for one hour. An amine-like odor is noted and there is obtained 0.2788 g. (92%) of a black polymer which is insoluble in dimethylacetamide, but soluble in concentrated sulfuric acid.

An infrared spectrum shows a substantial amount of thiazone structure. This black polymer shows no weight loss up to 400° C., a 9% loss at 600° C. and a 37% loss at 1100° C. in nitrogen by thermogravimetric analysis.

EXAMPLE XII

Polymerization of m-bianhydride with 3,3'-diaminobenzidine in three percent dimethylacetamide solution at room temperature 3,3'-diaminobenzidine purified by recrystallization (0.3 g., 0.001404 mole) is dissolved under a slow stream of nitrogen gas in 10 ml. of diethylacetamide in a 100 ml. three-neck, round-bottom flask equipped with a reflux condenser and a thermometer. The contents of the flask are stirred by a magnetic stirrer. m-bianhydride (0.408 g., 0.001404 mole) is dissolved in 13 ml. dimethylacetamide and added portionwise to the solution of the amine in the flask at room temperature. The color of the reacting solution changes from yellow to greenish-yellow, and then to orange-yellow. The polymer formed does not separate from the solution and the temperature of the solution does not increase appreciably. Stirring is continued for one hour at room temperature and then the solvent dimethylacetamide is distilled off at 15 mm. at 40–50° C. There is obtained a brown-colored, thick, viscous, syrupy liquid. A portion of the sample is taken out and dried overnight under vacuum at 50° C. to remove the last traces of solvent and there is obtained a yellow, powdery solid polymer (I), soluble in dimethylacetamide. Intrinsic viscosity is found to be 0.10 dl./g. in dimethylacetamide and 0.021 dl./g. in concentrated sulfuric acid at 20° C. An infrared spectrum is also recorded using the potassium bromide disc technique.

The rest of the viscous polymer is transferred to a polymerization tube equipped with a side arm and heated at 200° C. for seventeen hours under a slow stream of nitrogen gas. The temperature is maintained by an electronic controller. The color of the polymer turns brown and becomes insoluble in dimethylacetamide. A portion of the sample (II) is taken out and an infrared spectrum using the potassium bromide disc method, is recorded. Then the temperature of the block is raised to 300° C. and maintained at that temperature for two hours, the polymer becoming deep brown. A portion of the polymer (III) is taken out and an infrared spectrum is recorded. The intrinsic viscosity for sample (III) is found to be 0.021 dl./g. in concentrated sulfuric acid at 20° C. The temperature of the block is then raised to 400° C. and maintained at that temperature for two hours. The polymer becomes brownish-black and evolution of some neutral gases of obnoxious odor is observed. A portion of the sample (IV) is taken out and an infrared spectrum using the potassium bromide disc method is recorded.

The infrared spectrum of the initial condensation product (I) before heating shows distanct absorption bands for $SO_3H$ and $SO_2$—N at $8.1\mu$ and $8.4\mu$ respectively, and an intense band at $6.15\mu$ characteristic of amide carbonyl which disappears almost completely in the final polymer (IV) obtained by heating at 220° C. for seventeen hours plus, 300° C. for two hours plus, and 400° C. for two hours. Also, the final polymer (IV) shows an absorption band for $SO_2$—N at $8.5\mu$ and a shoulder at $8.1\mu$ characteristic of $SO_2H$ groups.

From this it is evident that the controlled polymerization of m-bianhydride with 3,3'-diaminobenzidine proceeds through two succesive stages, namely, (1) a ring opening step to yield a soluble intermediate (A) or hemipolymer, and (2) two consecutive dehydration steps on post-heating the polymer to yield the final insoluble polymer (C), bisbenzimidazo [1',2'-b; 1'',2''-b'] benzo [1,2-d, 5,4-d']-diisothiazole-6,6,8,8-tetroxide.

The steps in the polymerization of m-bianhydride with 3,3'-diaminobenzidine can be shown as follows:

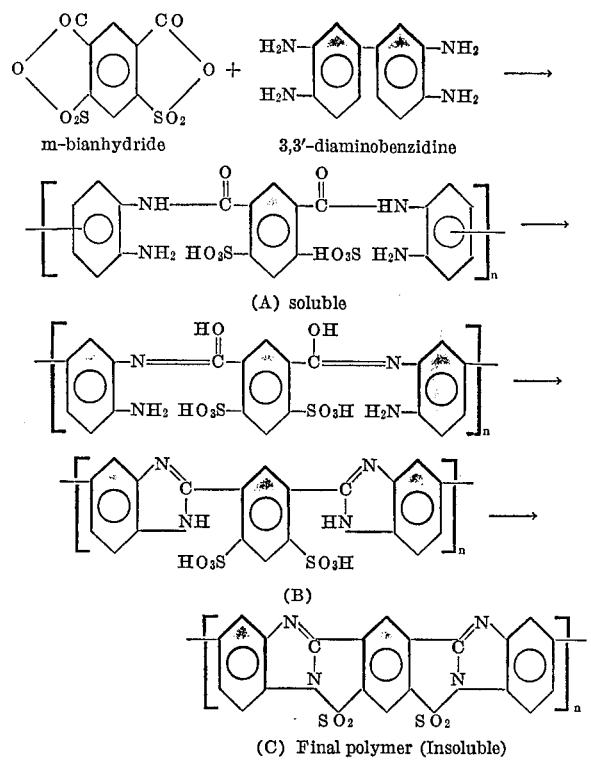

(C) Final polymer (Insoluble)

The final polymer (C) can also be represented by:

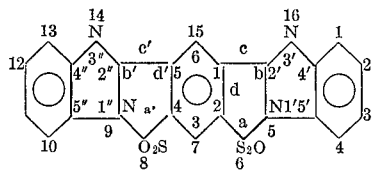

From the infrared spectra it appears that the initial condensation product, that is the soluble hemipolymer (1) is mainly in the form of (A), whereas the final insoluble polymer (IV) obtained by postheating polymer (I) to high temperatures may be a mixture of (B) and (C), of which form (C) is predominant.

EXAMPLE XIII

Polymerization of m-bianhydride with p-phenylenediamine in polyphosphoric acid by slow heating m-Bianhydride (2.90 g., 0.01 mole) and p-phenylenediamine (1.08 g., 0.01 mole) are added, under a slow stream of nitrogen, to polyphosphoric acid (100 g.) in a 250 ml. three-neck, round-bottom flask equipped with a mechanical stirrer and a thermometer. On mixing, the temperature of the mixture rises to 35° C. Then the temperature of the mixture is gradually raised to 110–120° C. and maintained at that temperature for six hours; then the temperature is raised to 150° C. and maintained at that temperature for five hours; then to 160–165° C. and maintained at that temperature for twenty-four hours, after which the temperature is finally raised to 170–175° C. and maintained at that temperature for fifty-three hours. The mixture becomes homogeneous after the first six hours of heating and the color of the solution turns yellow. Samples are withdrawn at various periods of time for use in characterization. After heating for a total period of eighty-seven hours, the reaction is discontinued. The polymers are isolated by procedures previously described above, and dried in a vacuum oven at 50° C. for forty hours. The final polymer is orange in color and does not melt up to 300° C., which is the upper limit of the Fisher-Johns melting point apparatus. Since the polymers are found to be insoluble in dimethylacetamide, concentrated sulfuric acid and concentrated sulfuric acid and concentrated sodium hydroxide solution, viscosity determination cannot be performed. The infrared spectrum of the polymer is recorded using a KBr disc. The spectrum is simple; it shows a broad absorption at $6.15\mu$ and some absorptions at $8.1\mu$ and $9.5\mu$ which may be due to residual $SO_3H$ group. The polymer has the structure shown below in Formula XXVI where $n'>n''$. Postheating of the polymer at 350° C. for one hour shows substantial thiazone structure upon infrared analysis.

EXAMPLE XIV

Polymerization of m-tetraacid with 3,3'-diaminobenzidine in polyphosphoric acid by slow heating m-Tetraacid (3.98 g., 0.01 mole) and 3,3'-diaminobenzidine (2.14 g., 0.01 mole) are added, under a slow stream of nitrogen gas, to 150 g. of polyphosphoric acid in a 150 ml., three-neck, round-bottom flask equipped with a mechanical stirrer and a thermometer. The temperature of the mixture is slowly raised from room temperature to 150° C. and held there until it becomes homogeneous. Samples are withdrawn at different intervals of time, quenched on crushed ice, the precipitated polymer isolated by decantation and washed thoroughly with large excess of water until the washings are neutral. The solubility characteristics, viscosities and the infrared spectra of the polymers using KBr discs are determined on the polymer samples. The infrared spectra show distinct absorptions for an amide carbonyl at $6.17\mu$ and for $SO_3H$ at $8.2\mu$ and $9.5\mu$. This indicates that these polymers are mainly in the form shown below in Formula XXVII.

As the reaction progresses, distinct changes in intrinsic viscosities and in the infrared spectra of the polymers are noted, due to both further condensation and dehydration in successive stages leading to some ring closure. In the polymer sample, there is an intense but broad absorption for $SO_2N$ in the region of $8.5\mu$ and a sharp but less intense absorption at $6.14\mu$, which appears to be due to the $C=N$ group, and a broad $SO_3H$ absorption in the region of $8.1\mu$. The polymer at this stage appears to be in the form of a mixture of structures, part of which are cyclized:

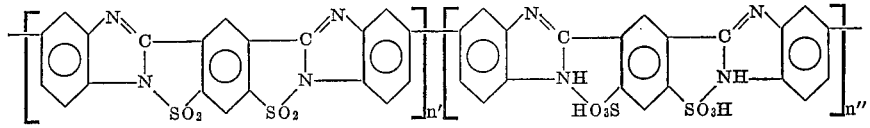

Most of the final ring closure takes place between 400 and 500° C. Accordingly, a polymer sample (IX) is post-heated for one hour at 400°C. and three hours at 420° C. under nitrogen in a polymerization tube using "Proportio-NULL" electronic temperature controller. The polymer turns black and there is no evolution of obnoxious gases as observed in some of the low molecular weight polymers. The thermogravimetric analysis of the final thiazone polymer did not show practically any weight loss up to about 520° C. in nitrogen. The weight losses at higher temperatures are as follows:

| Percent weight loss: | Temperature ° C |
|---|---|
| 2.7 | 600 |
| 6.3 | 700 |
| 10.8 | 800 |
| 20.0 | 900 |
| 38.0 | 1000 |

The infrared spectrum of a post-heated polymer (post-heated at 400° C. for one hour) is recorded using a KBr disc. The infrared spectrum is simple, and there are two main absorption bands, one in the region of $6.1\mu$, due to $C=N$, and the other at $8.6\mu$ due to $SO_2N$.

In the preceding Examples V, IX, XI, XII, the structures of the respective intermediate polymers are represented as follows:

The hemipolymer of Example V:

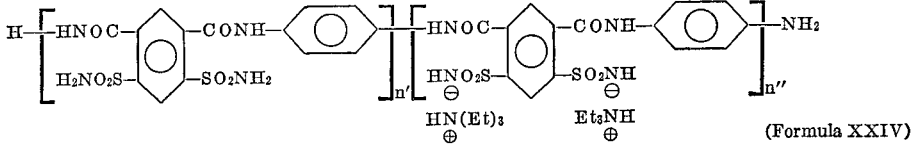

(Formula XXIV)

The hemipolymer of Example IX:

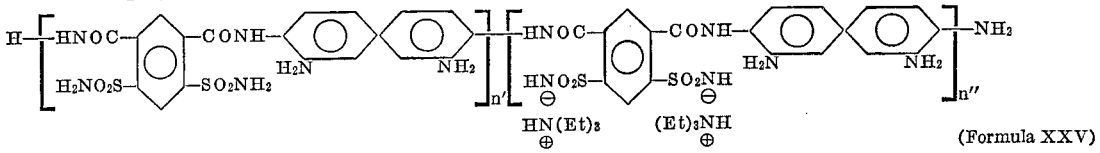

(Formula XXV)

The polymer of Example XI:

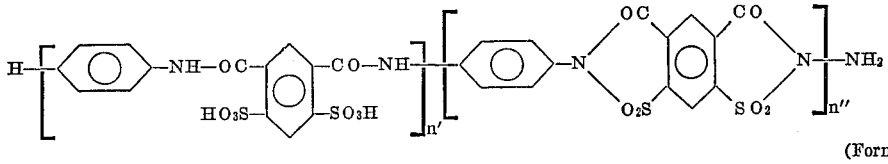

(Formula XXVI)

The polymer of Example XII:

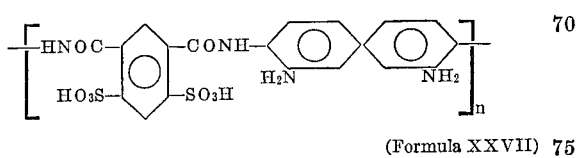

(Formula XXVII)

The thiazone repeating units of the polymers of Examples II and III have the formula:

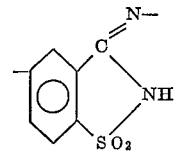

Some of the thiazone repeating units of the polymers of Example IV are represented by the formulas:

(c) 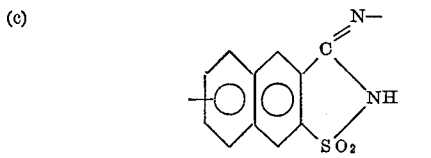

(d) 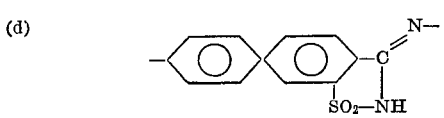

(e) 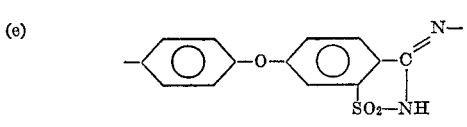

(j) 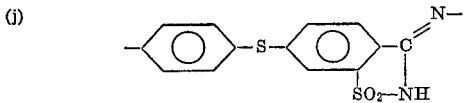

The thiazone repeating unit of the post-heated polymer of Example XI has the formula:

The thiazone repeating unit of the post-heated polymer of Example VIII has the formula:

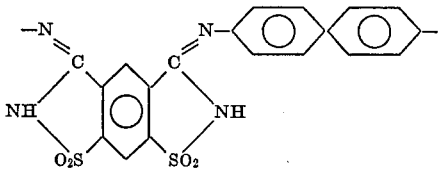

EXAMPLE XV

The procedure of Example V is repeated successfully a number of times for the preparation of other polymers of this invention using, in place of the p-phenylenediamine, an equivalent amount in each case of the following polyamines respectively:

(a) m-phenylenediamine;
(b) triaminobenzene;
(c) tetraminobenzene;
(d) diamino naphthalene;
(e) triaminonaphthalene;
(f) tetraaminonaphthalene;
(g) diaminodiphenyl;
(h) triaminodiphenyl;
(i) tetraaminodiphenyl;
(j) 4,4′-diaminodiphenyloxide;
(k) 4,4′diaminodiphenylamine;
(l) 4,4′diphenylsulfoxide;
(m) 4,4′-diphenylketone;
(n) 4,4′-diphenylsulfone;
(o) 4,4′-diphenylsulfoxide; and
(p) 4,4′-diphenylmethane.

Post-heating at 400° C. for two hours gives a substantial amount (well over one percent) of thiazone structure in each case.

EXAMPLE XVI

The procedure of Example V is repeated a number of times for the prepartion of polymers using individually in place of the bisaccharin an equivalent weight of the following respectively:

(a) the dicyclimide o naphthalene-1,5-dicarboxyl-2,6-disulfonic acid;
(b) the dicyclicimide of naphthalene-1,6-dicarboxyl-3,7-disulfonic acid;
(c) the dicyclicimide of diphenyl-4,4′dicarboxyl-3,3′ disulfonic acid;
(d) diphenylmethane-4,4′-dicarboxyl-3,3′-disulfonic acid;
(e) diphenylsulfide-3,3′-dicarboxyl-4,4′-dissufonic acid;
(f) diphenylsulfoxide-4,4′-dicarboxyl-3,3′-disulfonic acid;
(g) diphenylsulfone-4,4′-dicarboxyl-3,3′-disulfonic acid; and
(h) diphenylamine-3,3′-dicarboxyl-4,4′-disulfonic acid.

Post-heating at 400° C. for two hours gives a substantial amount (well over one percent) of thiazone structure in each case.

EXAMPLE XVII

The procedure of Example V is repeated successfully a number of times using individually in place of the p-phenylenediamine, an equivalent amount in each case of the following respectively:

(a) triaminobenzene;
(b) diaminonaphthalene;
(c) diaminodiphenyl;
(d) diaminodiphenyloxide;
(e) diaminodiphenylamine;
(f) diaminodiphenylsulfide; and
(g) diaminodiphenylmethane.

Post-heating at 400° C. for two hours gives a substantial amount (well over one percent) of thiazone structure in each case.

The various monomers described above as suitable for use in preparing polymers of this invention can be used in mixtures of two or more and likewise the polyamides can be used in mixtures of two or more to give polymers having a plurality of repeating units of the type defined herein.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A fiber forming polymer consisting essentially of repeating units selected from the group consisting of:

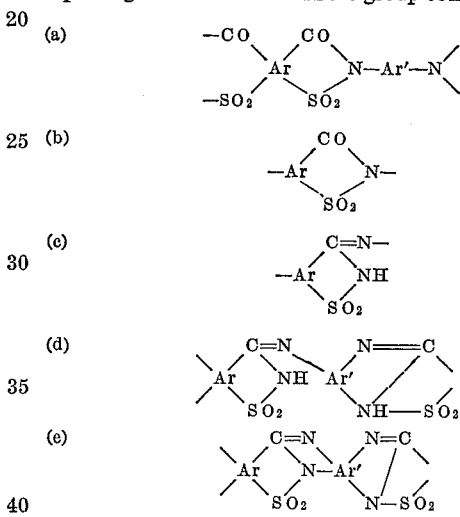

there being at least one percent by weight of a least one repeating unit selected from the group consisting of (c), (d), and (e); wherein Ar represents a polyvalent carbocyclic aromatic radical selected from the group consisting of benzene, diphenyl and naphthalene, said radical having the valencies to which said $SO_2$ and CO radicals are paired in positions ortho, or peri to each other on the aromatic radical; and Ar′ is a polyvalent carbocyclic radical selected from the group consisting of benzene, diphenyl and naphthalene.

2. A fiber forming polymer consisting essentially of repeating units selected from the group consisting of:

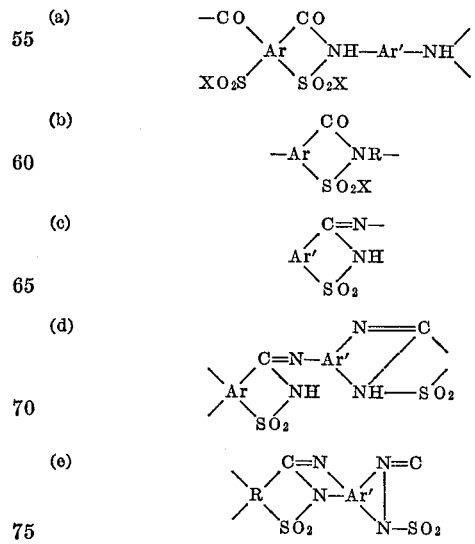

there being at least one percent by weight of at least one repeating unit selected from the group consisting of (c), (d), and (e); wherein Ar represents a polyvalent carbocyclic aromatic radical selected from the group consisting of benzene, diphenyl and naphthalene, said radical having the valencies to which said SO₂ and CO radicals are paired in positions ortho, or peri to each other on the aromatic radical; Ar' is a polyvalent carbocyclic radical selected from the group consisting of benzene, diphenyl and naphthalene; X represents a radical selected from the group consisting of —OR, NHR, —ONa, —Cl, and —Br; two X's of adjacent functional groups can also represent —O—, and two X's of adjacent functional group can also represent —NR—; and R is a radical selected from the group consisting of hydrogen and hydrocarbon of no more than 10 carbon atoms.

3. The polymer of claim 1 in which said repeating units are:

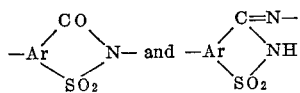

4. The polymer of claim 2 in which said repeating units consist essentially of:

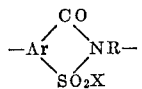

and

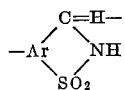

5. The polymer of claim 1 in which said repeating units consist essentially of:

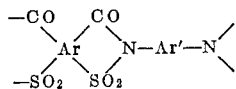

and

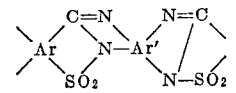

6. The polymer of claim 2 in which said repeating units consist essentially of:

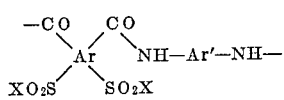

and

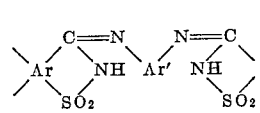

7. The polymer of claim 1 consisting essentially of repeating units having the formula:

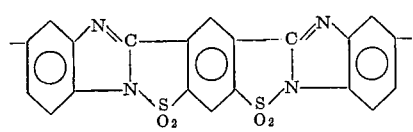

8. The polymer of claim 2 consisting essentially of repeating units having the formula:

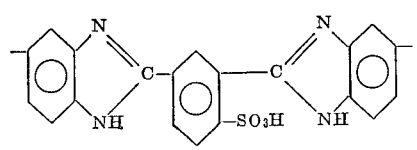

9. The polymer of claim 2 which contains at least one percent by weight of repeating units of the formula:

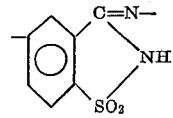

10. The polymer of claim 2 which contains at least one percent by weight of repeating units of the formula:

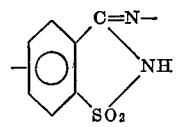

11. The polymer of claim 2 which contains at least one percent by weight of repeating units of the formula:

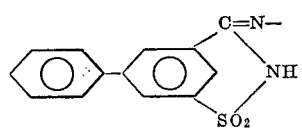

12. The polymer of claim 2 which contains at least one percent by weight of repeating units of the formula:

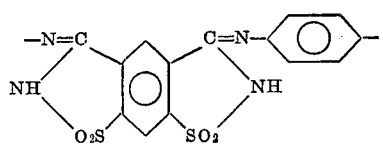

13. The polymer of claim 2 which contains at least one percent by weight of repeating units of the formula:

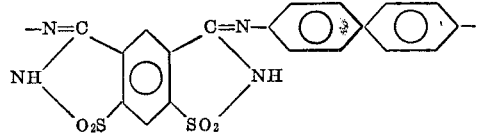

14. The process of preparing a fiber forming thiazone polymer of claim 2 comprising the step of heating to a temperature of at least 300° C. for at least 15 minutes a polymer having a plurality of repeating units having the formula:

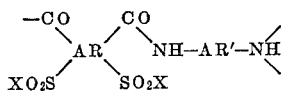

15. The process of preparing a fiber forming thiazone polymer of claim 2 comprising the step of heating to a temperature of at least 300° C. for at least 15 minutes a polymer having a plurality of repeating units having the formula:

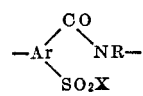

16. The process of claim 15 in which said repeating unit has the formula

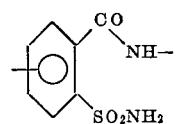

(References on following page)

References Cited

UNITED STATES PATENTS

| | | | |
|---|---|---|---|
| 3,184,436 | 5/1965 | Magat | 260—78 |
| 3,296,204 | 1/1967 | Caldwell | 260—78 |
| 3,440,196 | 4/1969 | Boldebuck | 260—9 |
| 2,621,168 | 12/1952 | Ross et al. | 260—78 |
| 3,110,701 | 11/1963 | Wear | 260—78 |
| 3,142,662 | 7/1964 | Huffman | 260—78 |
| 3,453,244 | 7/1969 | Preston | 260—78 |

OTHER REFERENCES

Chem. Abst. vol. 67: 11589y, "Polyaromatic Heterocycles," Marvel.

HAROLD D. ANDERSON, Primary Examiner

E. WOODBERRY, Assistant Examiner

U.S. Cl. X.R.

161—227; 260—29.2, 30.4, 30.6, 30.8, 32.6, 47, 63, 79.3